(12) United States Patent
Minkovich et al.

(10) Patent No.: US 10,454,944 B2
(45) Date of Patent: *Oct. 22, 2019

(54) GEOFENCING OF DATA IN A CLOUD-BASED ENVIRONMENT

(71) Applicant: Box, Inc., Redwood City, CA (US)

(72) Inventors: Kirill Minkovich, Campbell, CA (US); Pranava Adduri, Fremont, CA (US)

(73) Assignee: Box, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,984

(22) Filed: Dec. 28, 2017

(65) Prior Publication Data

US 2018/0124066 A1    May 3, 2018

Related U.S. Application Data

(63) Continuation of application No. 14/929,920, filed on Nov. 2, 2015, now Pat. No. 9,860,256.

(51) Int. Cl.
| | |
|---|---|
| *H04L 29/06* | (2006.01) |
| *G06F 21/60* | (2013.01) |
| *H04W 12/08* | (2009.01) |
| *H04L 9/08* | (2006.01) |
| *H04L 9/32* | (2006.01) |
| *G06F 21/62* | (2013.01) |
| *H04W 4/021* | (2018.01) |
| *G06F 21/00* | (2013.01) |

(52) U.S. Cl.
CPC ............ *H04L 63/107* (2013.01); *G06F 21/00* (2013.01); *G06F 21/602* (2013.01); *G06F 21/6218* (2013.01); *H04L 9/0872* (2013.01); *H04L 9/3236* (2013.01); *H04L 9/3297* (2013.01); *H04W 4/021* (2013.01); *H04W 12/08* (2013.01); *G06F 2221/2111* (2013.01)

(58) Field of Classification Search
CPC ..... H04L 63/10; H04L 63/107; H04L 9/0872; H04L 9/3236; H04L 9/3297; G06F 21/602; G06F 21/6218; H04W 4/021; H04W 12/08

See application file for complete search history.

(56) References Cited

U.S. PATENT DOCUMENTS

| | | |
|---|---|---|
| 6,721,652 B1 | 4/2004 | Sanqunetti |
| 6,983,202 B2 | 1/2006 | Sanqunetti |
| 7,164,986 B2 | 1/2007 | Humphries et al. |
| 7,492,315 B2 | 2/2009 | Verechtchiagine |
| 7,493,211 B2 | 2/2009 | Breen |
| 7,498,985 B1 | 3/2009 | Woo et al. |
| 7,973,707 B2 | 7/2011 | Verechtchiagine |
| 8,471,701 B2 | 6/2013 | Yariv et al. |

(Continued)

OTHER PUBLICATIONS

Non-Final Office Action dated May 4, 2017 for U.S. Appl. No. 14/929,920.

(Continued)

*Primary Examiner* — Yogesh Paliwal

(74) *Attorney, Agent, or Firm* — Vista IP Law Group, LLP

(57) ABSTRACT

Disclosed is an approach to incorporate geographical access control features for a cloud-based storage platform. This allows, for example, enterprise administrators to define geographical areas (geofences) with arbitrary precision within which content access can be denied for items of data.

18 Claims, 16 Drawing Sheets

(56) References Cited

U.S. PATENT DOCUMENTS

| | | |
|---|---|---|
| 8,593,276 B2 | 11/2013 | Doyle |
| 8,810,454 B2 | 8/2014 | Cosman |
| 2002/0136407 A1* | 9/2002 | Denning .................. G06F 21/10 380/258 |
| 2004/0190715 A1* | 9/2004 | Nimura ............... G06F 21/6209 380/44 |
| 2009/0055091 A1 | 2/2009 | Hines et al. |
| 2012/0254432 A1* | 10/2012 | Roseborough .......... H04L 67/06 709/226 |
| 2013/0331118 A1 | 12/2013 | Chhabra et al. |
| 2014/0014770 A1 | 1/2014 | Teller et al. |
| 2014/0057648 A1 | 2/2014 | Lyman et al. |
| 2014/0164118 A1 | 6/2014 | Polachi |
| 2014/0351411 A1 | 11/2014 | Woods et al. |
| 2015/0310188 A1* | 10/2015 | Ford ....................... G06F 21/10 726/28 |
| 2015/0348146 A1 | 12/2015 | Shanmugam et al. |

OTHER PUBLICATIONS

Notice of Allowance dated Aug. 31, 2017 for U.S. Appl. No. 14/929,920.

* cited by examiner

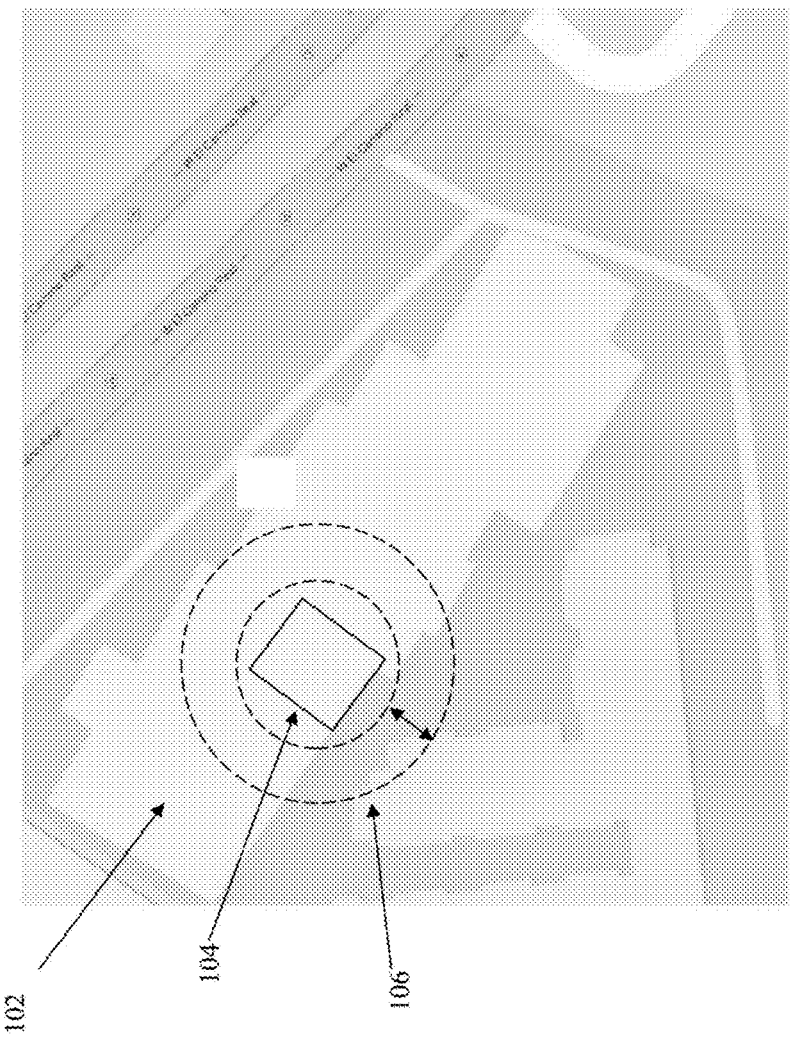

GEOFENCING OF DATA IN A CLOUD-BASED ENVIRONMENT

CROSS-REFERENCE TO RELATED APPLICATION(S)

This application is a continuation of U.S. application Ser. No. 14/929,920, filed on Nov. 2, 2015, which is hereby incorporated by reference in its entirety for all purposes.

BACKGROUND

The proliferation of cloud-based services and platforms continues to increase. Specifically, cloud-based content management services and platforms have impacted the way personal and corporate information is stored, and has also impacted the way personal and corporate information is shared and managed. For example, as electronic and digital content use in enterprise settings and/or other organizational settings has become the preferred mechanism for project, task, and work flow management, so has the need for streamlined collaboration and sharing of digital content and documents. In such collaboration environments, multiple users share, access, and otherwise perform actions or tasks on content and files in shared workspaces.

Any individual, organization, or enterprises (e.g., companies, firms, etc.) might want to use cloud-based content management platforms to secure, store and manage sensitive proprietary content while enhancing workforce productivity.

However, challenges exist in being able to provide this shared access and collaboration with high availability of the data (e.g., an unfettered ability to download and upload files) while also being able to do so in a secure manner. The collaboration environments should include features or mechanisms that add security mechanisms to the access of content and files in the shared workspaces.

Legacy approaches to providing content management services have several limitations. For example, most legacy approaches rely only upon user identification, password-based access control, or role-based security for access to content when a need arises to use or apply one or more of the content management features (e.g., content access, editing, sharing, collaboration, etc.). One problem with these traditional access control approaches is that they cannot prevent access if the user is actually located in an unsecure or unauthorized geographic location.

The problem to be solved is therefore rooted in technological limitations of the legacy approaches. Improved techniques, in particular improved application of technology, are needed to address the problem of incorporating geographical access control features, e.g., to a cloud-based storage platform.

Therefore, there is a need for an improved approach to provide access controls to data which can incorporate geographical access parameters.

SUMMARY

Some embodiments of the invention incorporate geographical access control features into a cloud-based storage platform. This allows, for example, enterprise administrators to define geographical areas with arbitrary precision within which content access can be denied for items of data.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 1F illustrates a configurable boundary drawn on a map portion.

DETAILED DESCRIPTION

Figure 1A:
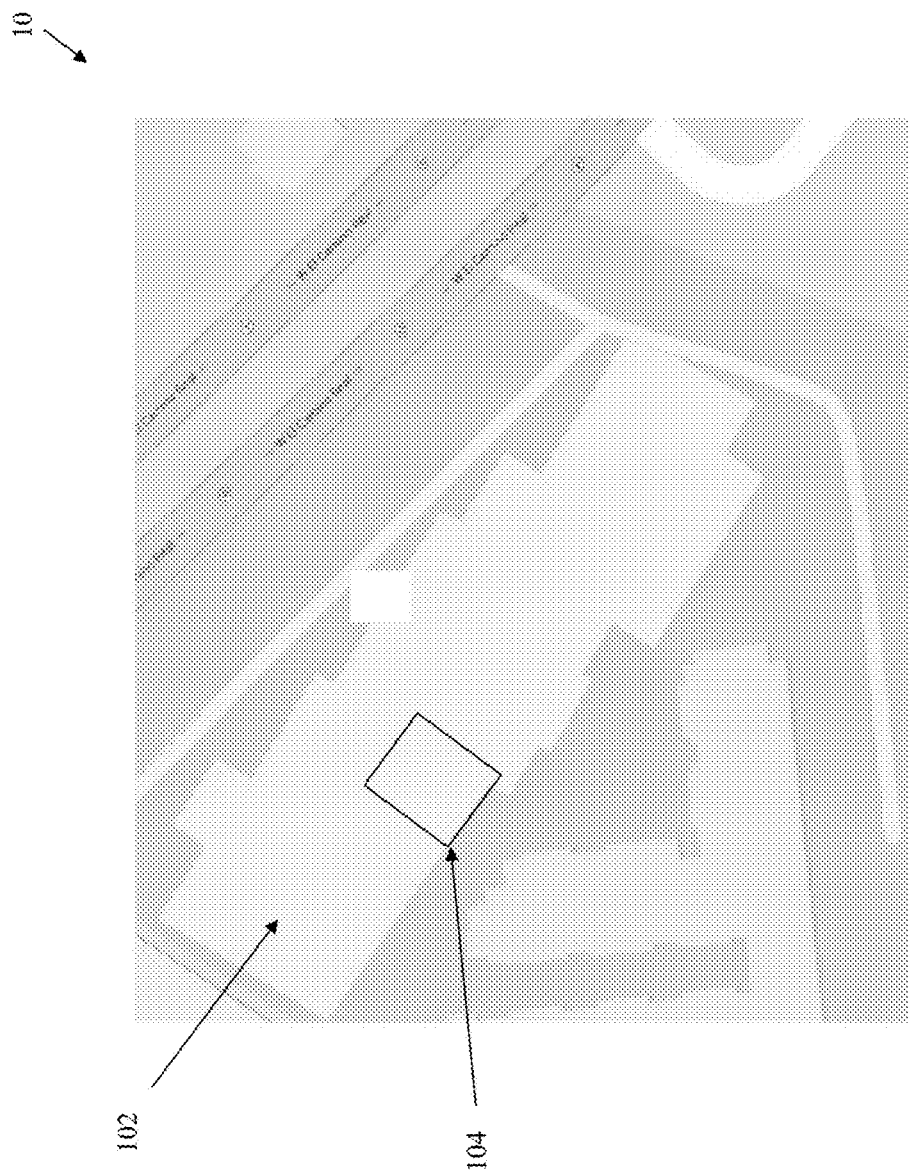
FIG. 1A illustrates a map portion.

Some embodiments of the present disclosure address the problem of incorporating geographical access control features of a cloud-based storage platform. This allows, for example, enterprise administrators to define geographical areas (geofences) with arbitrary precision within which content access can be applied to items of data.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Illustrative Embodiment

Individual, organization, and enterprises (e.g., companies, firms, etc.) want to be able to use cloud-based content management platforms to securely store, manage, and access content in the storage system.

Some embodiments of the present disclosure address the above-described problems by incorporating geographical access control features of a cloud-based storage platform. This allows, for example, enterprise administrators to define geographical areas (geofences) with arbitrary precision within which content access can be applied to items of data.

To illustrate this aspect of the invention, consider the map portion 10 shown in FIG. 1A. This figure shows an example building 102 located at a specific geographic location represented by map portion 10. Assume that a given enterprise leases an office space 104 located within building 102. Further assume that the enterprise possesses corporate data that is considered to be sensitive, and for which the enterprise would like to prevent any access to that data unless the user seeking access is located within the geographic location of the office space 104.

Figure 1B:
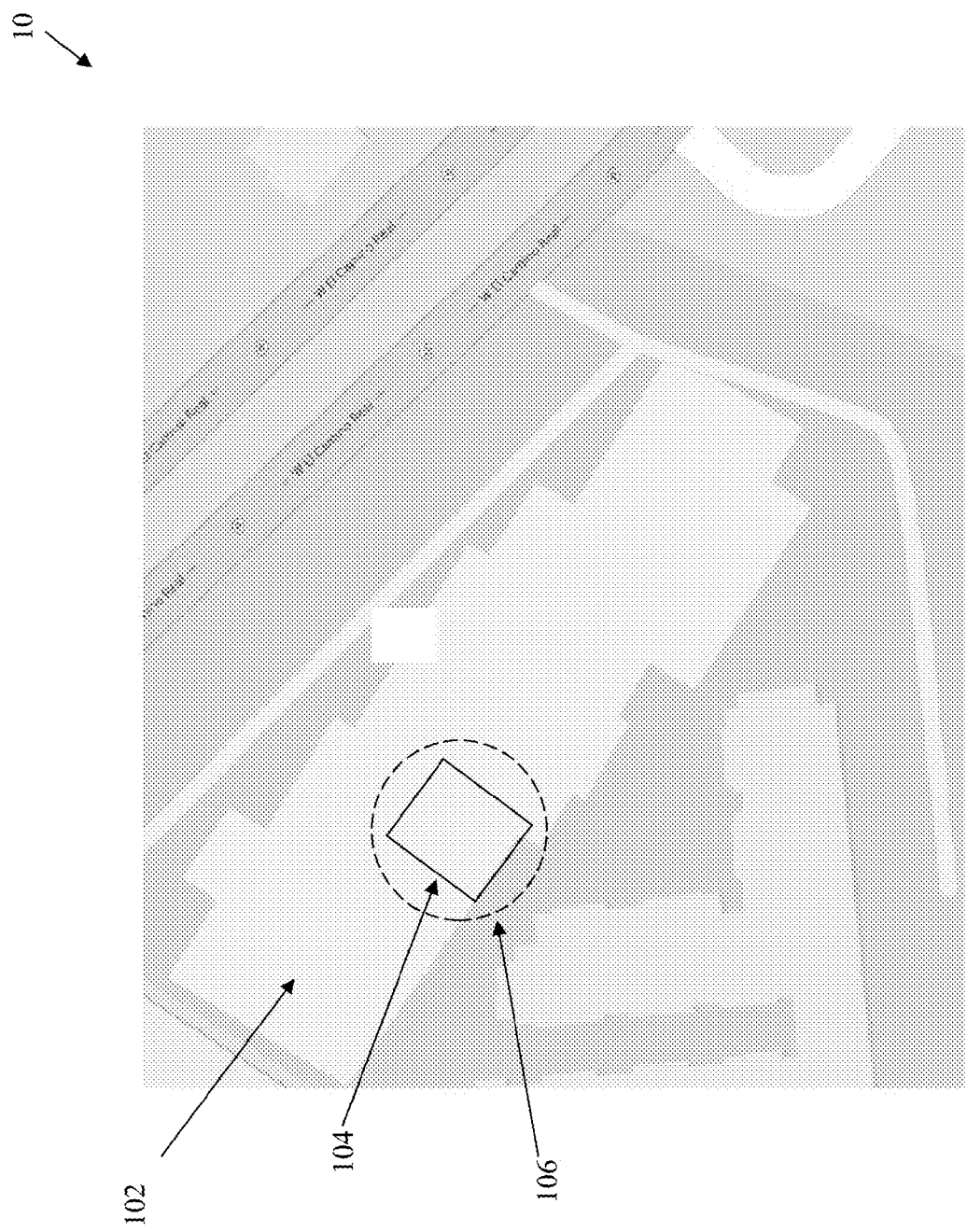
FIG. 1B illustrates a boundary drawn on a map portion.

The present invention provides geographic access controls that enable this desired functionality, such that only users within a designated geographic area would be permitted to access the corporate data. As shown in FIG. 1B, a boundary 106 could be geographically defined to encapsulate an area for which the user is permitted to access designated items of data.

Figure 1C:
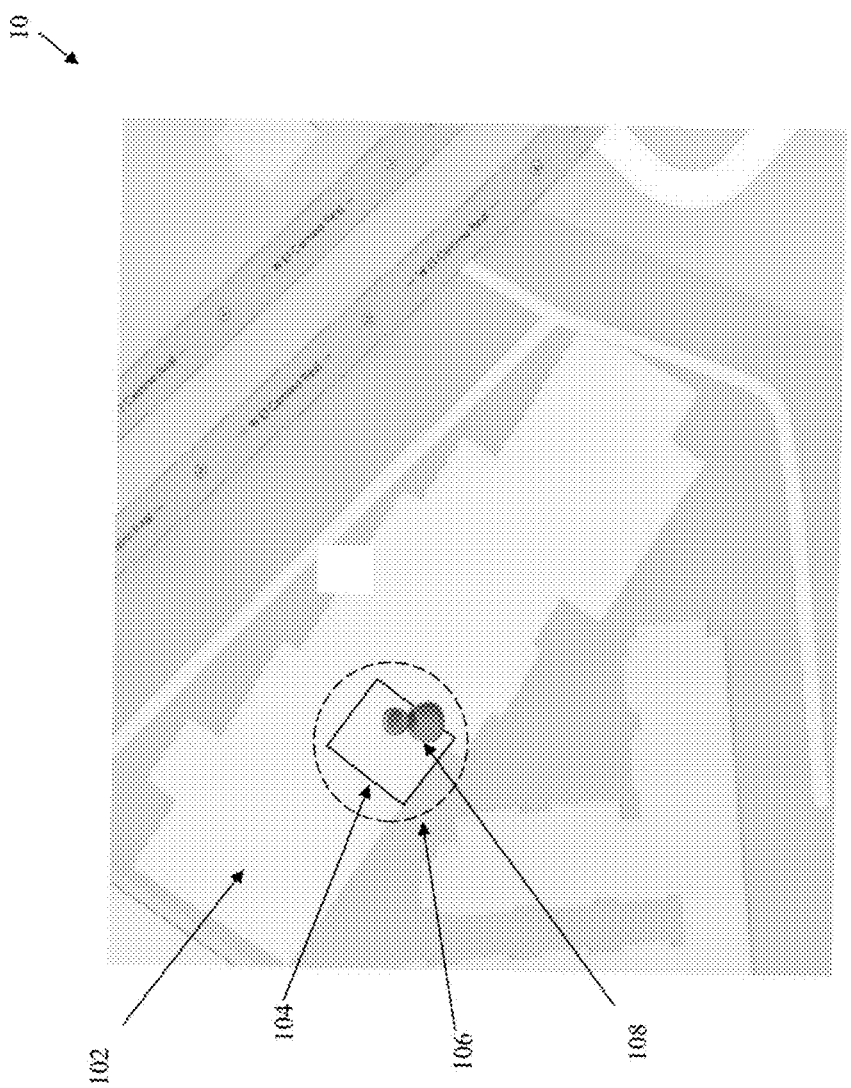
FIG. 1C illustrates the situation when the user is located within a specified boundary.
Figure 1D:
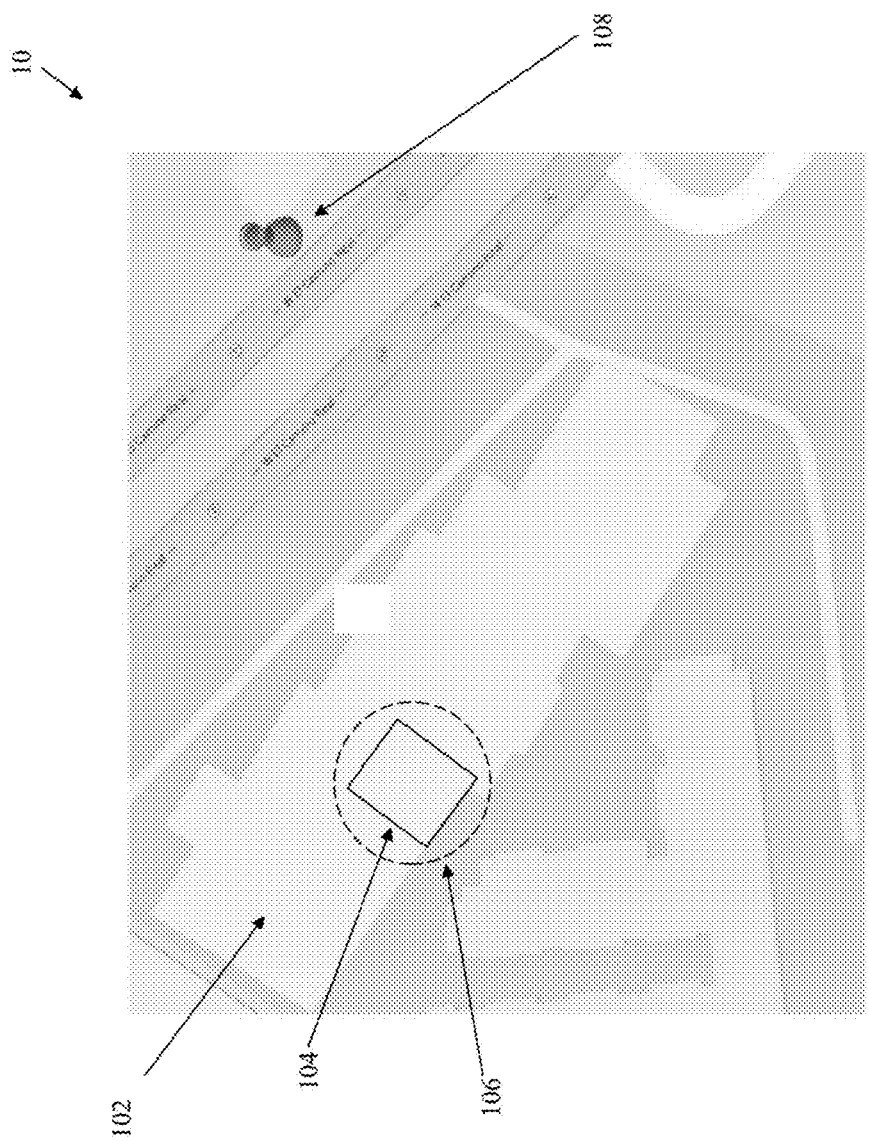
FIG. 1D illustrates the situation where the user is located outside the boundary.

FIG. 1C illustrates the situation when the user 108 is located within the specified boundary 106. In this situation, since the user is located within the geographic boundary 106, then the user is permitted access to the data. FIG. 1D illustrates the situation where the user 108 is located outside the boundary 106. In this situation, since the user is located outside the geographic boundary 106, then the user is not permitted to access to the data.

Figure 1E:
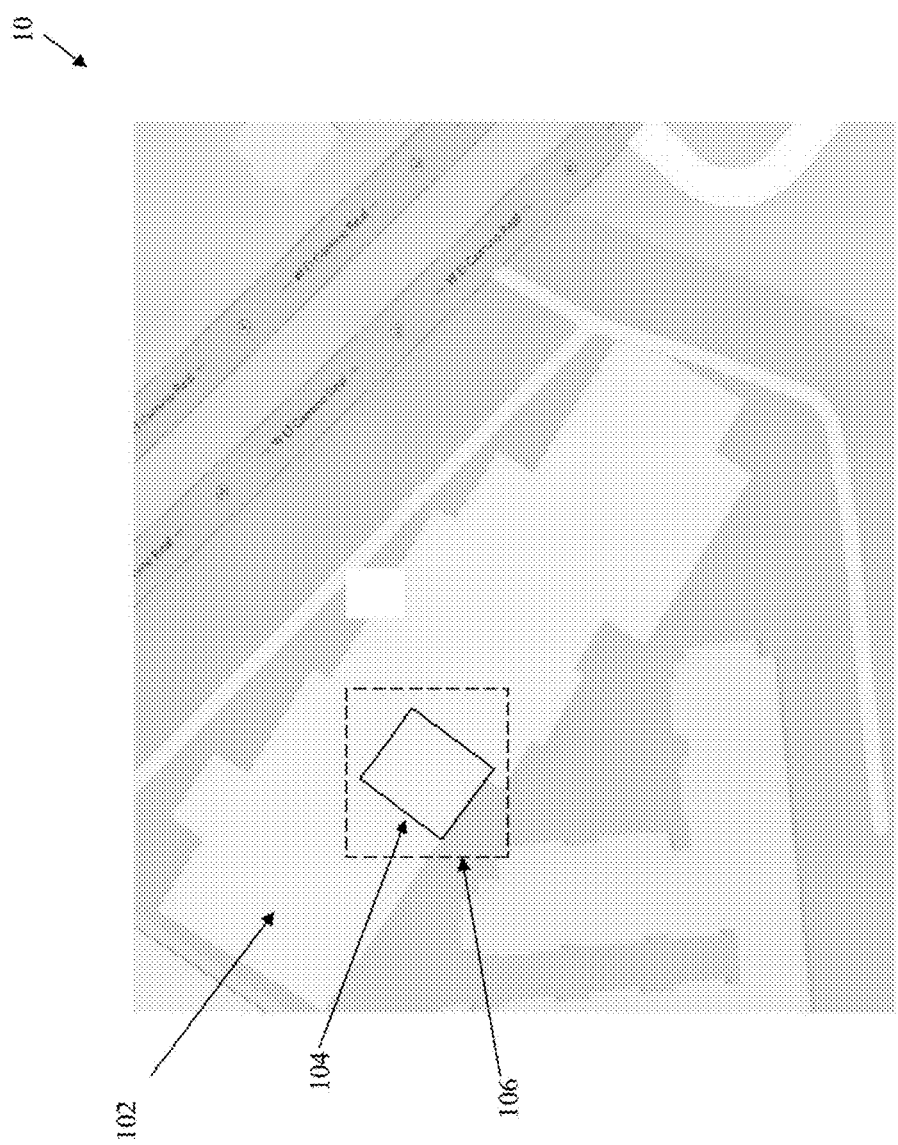
FIG. 1E illustrates a rectangular boundary drawn on a map portion.

It is noted that any suitable shape could be applied to define boundary 106. For example, as shown in FIG. 1E, rectangular shapes can be used to boundary 106. Other types of shapes, such as irregular shapes, curved shapes, and open-ended shapes, can also be used to define boundary 106. As shown in FIG. 1F, the boundary 106 can be re-configured (e.g., re-sized) as desired to encapsulate any geographic location of interest.

Figure 2:
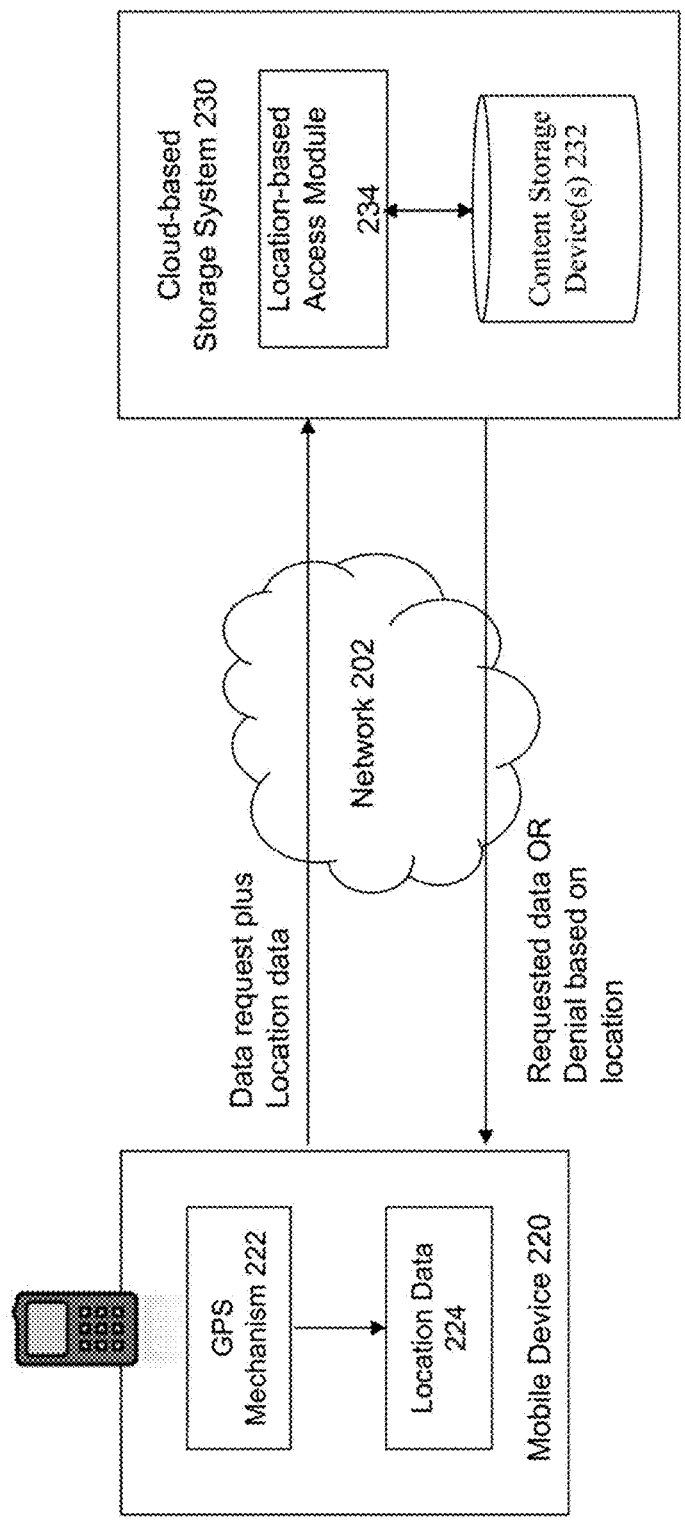
FIG. 2 illustrates an example architecture that may be used to implement some embodiments of the invention.

FIG. 2 illustrates an example architecture that may be used to implement some embodiments of the invention. Mobile device 220 includes a storage application that is operable to allow a user to utilize the mobile device 220 to access data located on a cloud-based storage system 230. In some embodiments, the storage application may access hardware devices on the mobile device 220. For example, the mobile application may utilize a GPS locator mechanism 222 on the mobile device 220 to generate location data 224. The mobile device 220 may also include a communications mechanism to send and receive data over a network 202 to a remote cloud-based storage system 230. In some embodiments, the communications mechanism operates to allow the mobile device 220 to communicate using a cellular network connection, e.g., when the mobile device 220 is a mobile telephone. The communications mechanism may also be implemented to allow the mobile device 220 to communicate using other networking paradigms, e.g., to communicate over a WiFi network.

The cloud-based storage system 230 includes a mobile interface that is operable to receive data requests and to send requested data to the mobile device. The cloud-based storage system 230 may include or be associated with one or more content storage devices 232. The content storage devices 232 hold data that is maintained by the cloud-based storage system 230.

Figure 3:
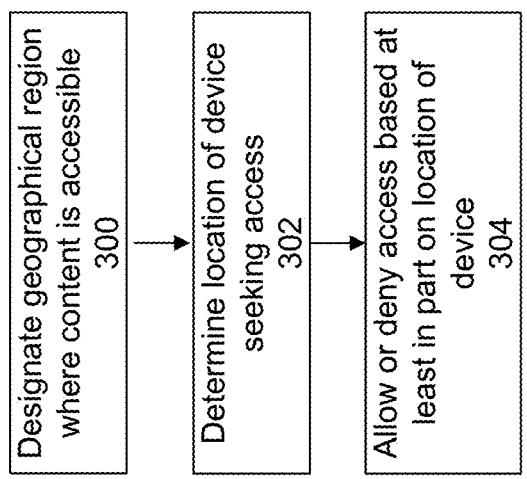
FIG. 3 shows a high level flowchart of the processing actions performed by a location-based access module.

The cloud-based storage system 230 includes location-based access module 234 for processing access control to content on the cloud-based storage system 230 using location data. FIG. 3 shows a high level flowchart of the processing actions performed by location-based access module 234 to implement geographic access control over content located within the cloud-based storage system 230. At 300, a geographic region is designated over which content is accessible. In some embodiment, the geographic area may be configured having any arbitrary size, shape, and/or precision.

A request may later be received for the content. At 302, a determination is made of the location for the device that has issued the request. This determination may be based upon location coordinates that were generated from a GPS mechanism on the user's device. In some embodiments, the exact coordinates may be hashed/encrypted to protect the user's privacy.

At 304, the request is allowed or denied based at least in part upon the user's location. If the user is located within the acceptable geographic region, then access is provided to the requested content. On the other hand, if the user is located outside of the acceptable geographic region, then access is denied to the requested content.

In some embodiments, the opposite configuration is made—where the geographic region defines a location for which access is denied (rather than defining the geographic location where access is allowed). In this situation, the geographic region is configured to be an exclusion zone from which access is not permitted to the data. For example, a corporation may choose to designate the geographic location of its competitors as an exclusion zone from which that organization's data cannot be accessed.

Figure 4:
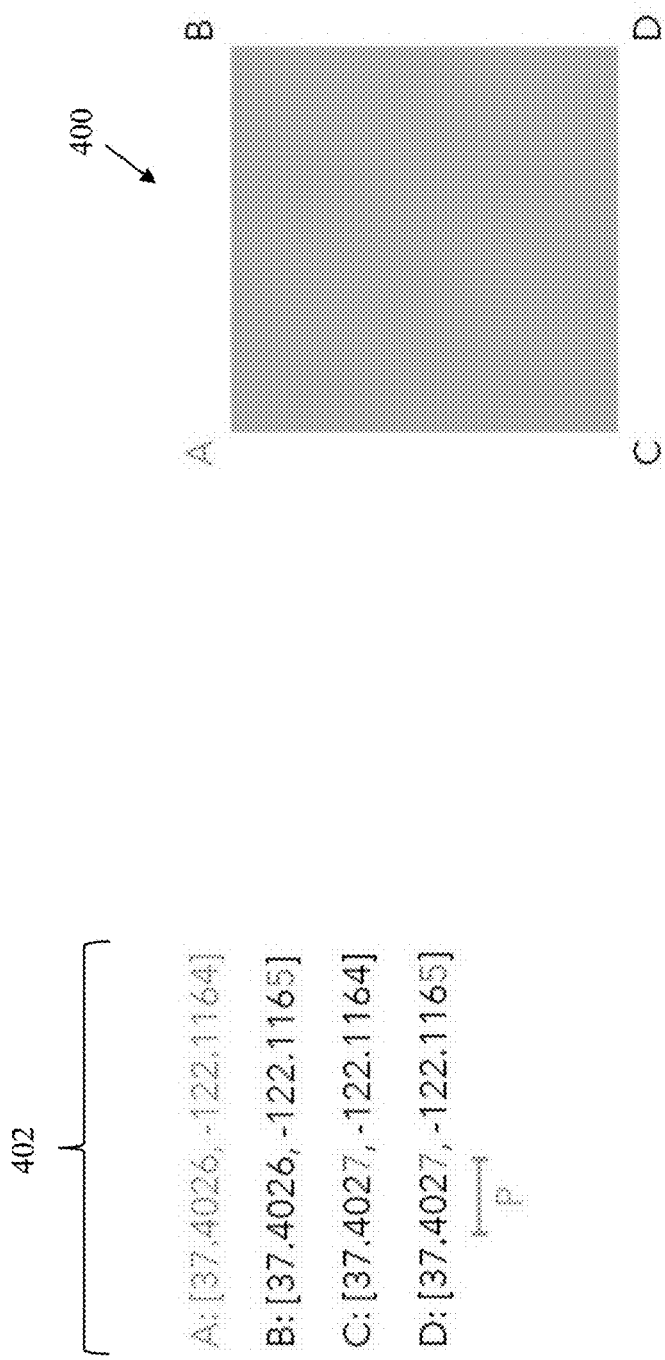
FIG. 4 illustrates a grid square.

To configure the geographic-based access control, a grid precision and a set of grid squares (GSs) can be defined that describe an area where the content can be viewed. As illustrated in FIG. 4, a grid square 400 is represented by a single coordinate (A) with a fixed precision P. A square is constructed by incrementing the least significant digit of A. Latitude and A. Longitude. In this example, the precision (P) is equal to four.

In this example, a starting point coordinate may exist somewhere within the square 400. By truncating the coordinate to the four digits of Precision P, this results in the specific coordinate for A being identified. For example, the original starting point coordinate may be [37.40265,−122.11645], but removal of the least significant digit ("XX.XXXX5" from both latitude and longitude) results in the coordinate for A of [37.4026,−122.1164]. From this coordinate A, the other corners B, C, and D can be obtained by incrementing and/or decrementing the least significant remaining digit. The amount to increment or decrement is configurable to adjust the desired level of coverage granularity for the location-based access. For example, incrementing by "1" as shown in FIG. 4 allows for smaller grid square sizes. Incrementing by a larger value (e.g., "2" or "3") increases the granularly of the square. Incrementing by different values of the latitude and longitude can be used to create non-square grid shapes.

Figure 5:
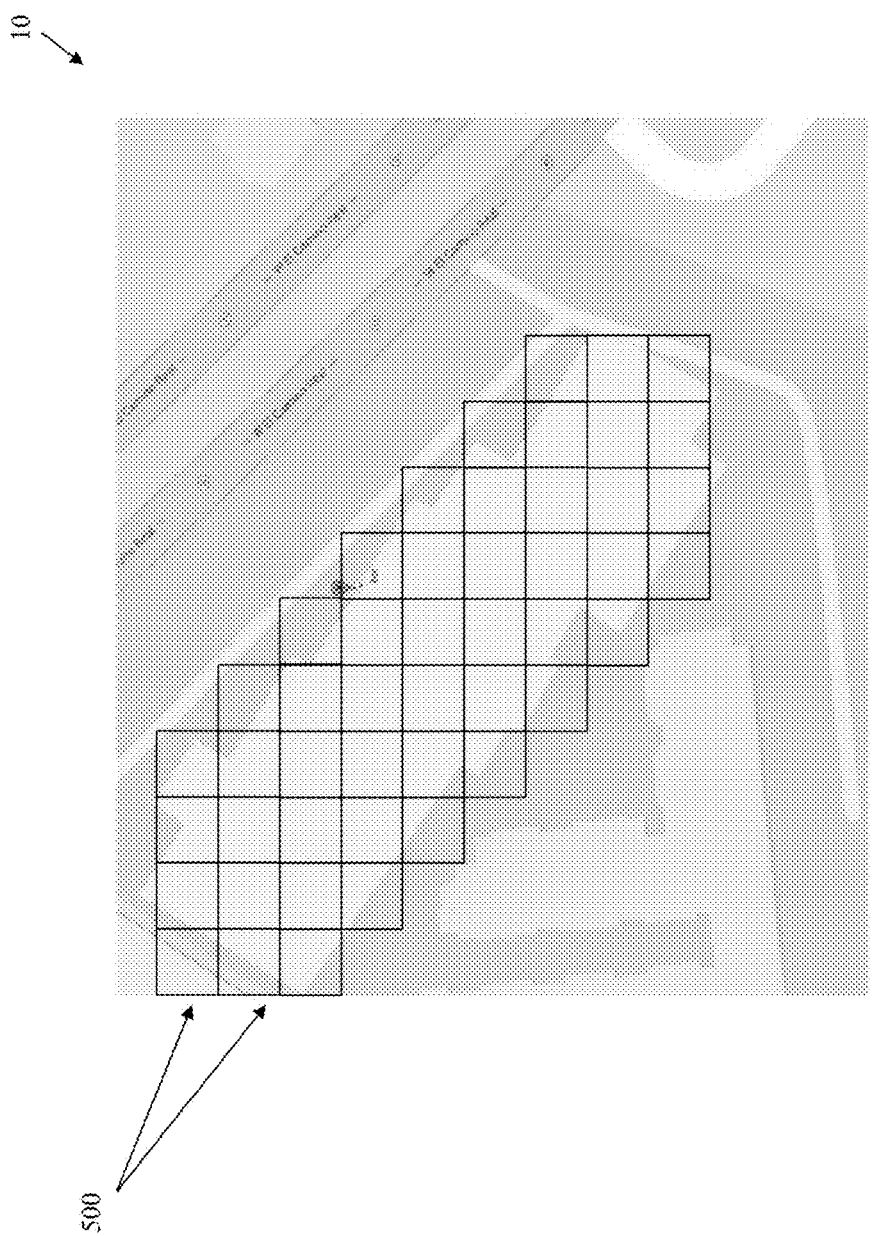
FIG. 5 illustrates a set of grid squares that can be used to blanket locations for location-based access to data.

What this accomplishes is that instead of having just a single point, a geographic region of a given level of granularity can be defined from that point. Instead of an exact location, this means that a certain amount of coverage can be configured with a defined level of uncertainty over the exact location. As shown in FIG. 5, an entire set of these grid squares 500 can be used to blanket locations for location-based access to data. In some embodiments, the grid squares have boundaries that exactly match the boundary of an adjacent square. In alternate embodiments, the grid squares are overlapping shapes.

Figure 6:
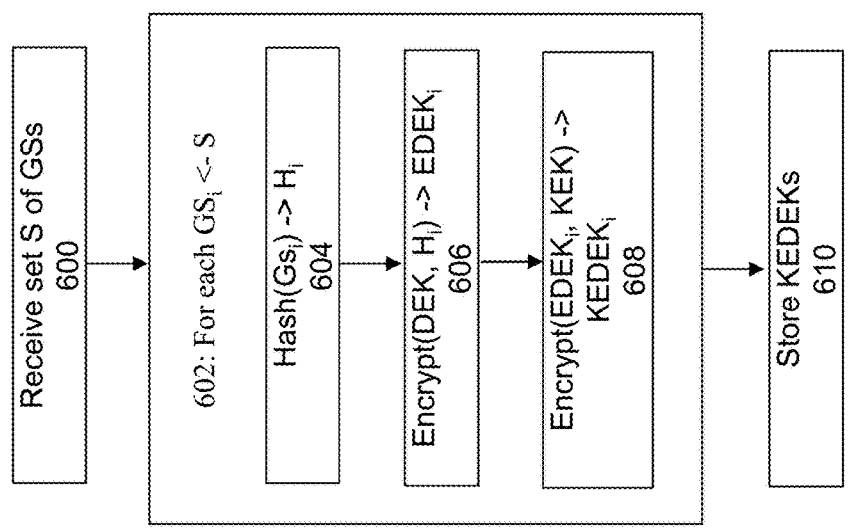
FIG. 6 shows a detailed flowchart of an approach to implement server-side processing according to some embodiments of the invention.

FIG. 6 shows a detailed flowchart of an approach to implement server-side processing according to some embodiments of the invention. At 600, a content administrator may designate a region which is represented by a set of grid squares (GSs). The GSs are represented as described above with respect to FIGS. 4 and 5.

At 602, a set of processing steps is performed for each GS, within the set (S). At 604, a one-way hash is applied to the location data represented by GS to generate a hash value (H). A one-way hash is an algorithm for which it is impossible or reasonably unlikely for one to be able to obtain an original value from its hashed value. In the current invention, a one-way hash can be used to protect the privacy interests implicit in the location of a user. Therefore, instead of using actual locations, a one-way hashed value (H) is used to represent the actual location.

It is assumed that content to be protected is encrypted with an encryption key (DEK). Collaboration environments often include features or mechanisms that provide security through the use of data item (or file) encryption. The file encryption features can, for example, include encrypting an encryption key used that is used to encrypt a data or content item (e.g., a file). The DEK can be any suitable key that is usable to encrypt the content of interest.

At 606, the encryption key (DEK) is encrypted using the hash value (H). This results in an encrypted encryption key (EDEK). In this way, the original encryption key DEK can only be obtained if the hash value H pertaining to a specific grid is later provided for the decryption process. The DEK may be specific to each item of content, e.g., a specific DEK for each file stored in the system.

In some embodiments, another encryption process can be applied to double-encrypt the security keys. At 608, the encrypted encryption key (EDEK) is encrypted using a key encryption key (KEK). This results in a twice encrypted key (KEDEK). It is noted that some embodiments of the invention would not require double encryption of the keys, and hence would not need to employ KEDEK values.

By running the above process through every grid square GS in the set S, an entire collection of KEDEKs can be obtained for a region for which the content of interest may be accessed. At 610, the set of KEDEKs is stored for later access.

Figure 7:
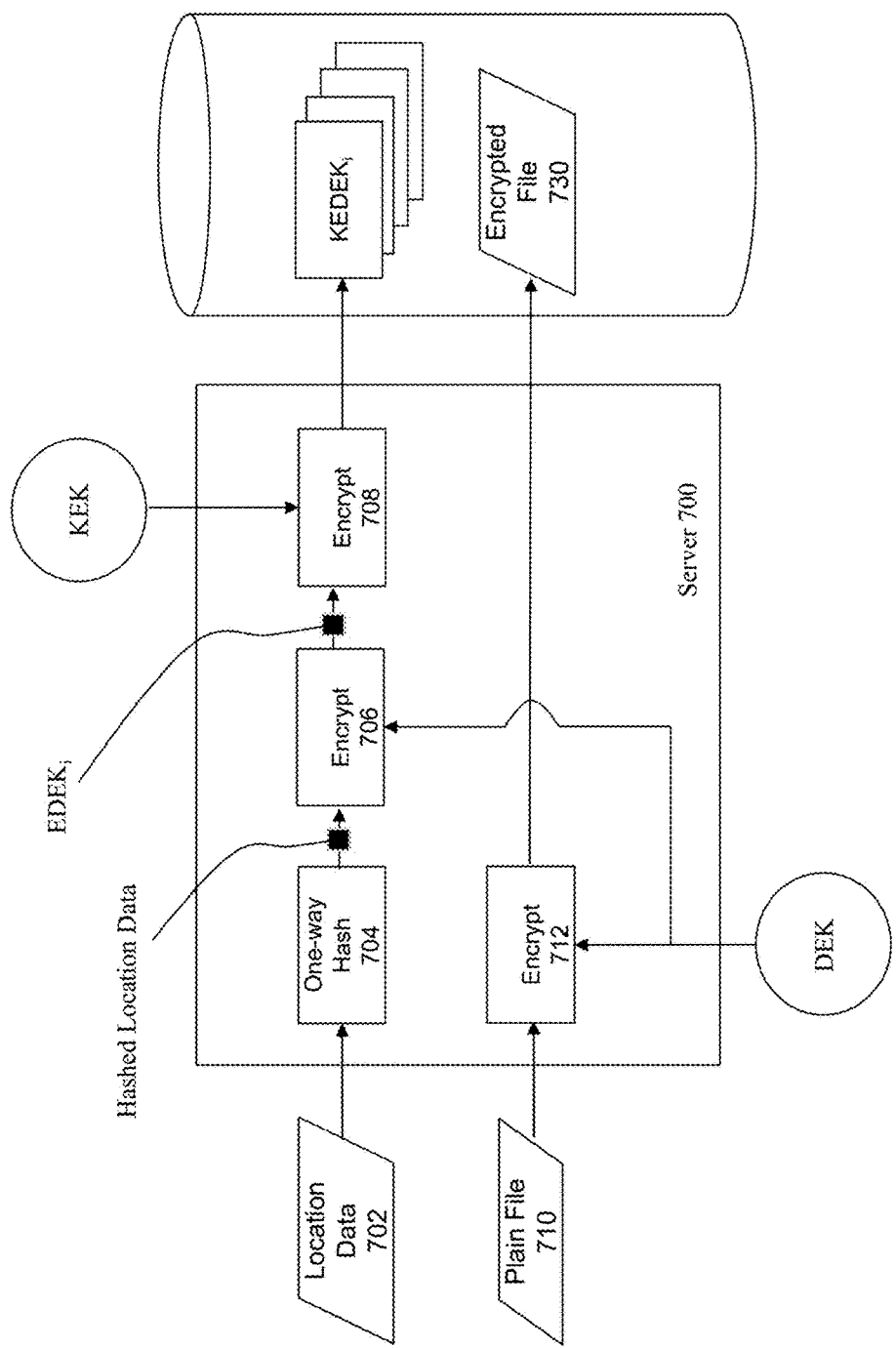
FIG. 7 illustrates an architecture of a system to implement come embodiments of the invention.

FIG. 7 illustrates an architecture of a system to implement this process. A plain file 710 is received that is encrypted by encryption module 712 using a DEK. The encrypted file 730 can then be stored within the cloud-based storage system. This is a file that is restricted geographically as previously described.

Location data 702 may be designated by a content administrator, e.g., using an interface as shown in FIG. 1F where a configurable interface object (e.g., the circular object 106) can be manipulated to define the size, shape, and/or location of a region of interest. This results in a set of GS data for a region that is hashed using a one-way hashing module 704.

The hashed GS data is then used by encryption module 706 to encrypt the DEK value to form an encrypted value EDEK. The EDEK value is then encrypted again by module 708 with a KEK value to form the KEDEK value. The set of KEDEK values are then stored for later access.

Any key management approach can be used to manage the encryption keys in the system. In some embodiments, remote key management services are maintained for a collaborative cloud-based environment using a hardware security module (HSM). The HSM can be security hosted in a number of ways. For example, the HSM can be hosted by the cloud-based platform. In such cases, the HSM is logically separate from other components of the cloud-based platform but accessible to the components via key requests at the behest of a remote enterprise client. Alternatively or additionally, the HSM can be hosted by another distinct cloud-based platform such as, for example, Amazon AWS or by a managed services provider (MSP) such as, for example, Equinox Managed Services. Additionally, in some embodiments, the enterprise (or remote) client can provide client-side control and configurability of the second layer of key encryption. In such cases, a key management engine and/or the HSM can provide the client-side control and configurability through the use of a rule engine that can process a generated access reason to determine whether or not to encrypt or decrypt (or request encryption or decryption of) a corresponding encryption key based, at least in part, on a set of pre-defined client-configurable rules. Additionally, in various embodiments a kill switch is provided to the client at the HSM and/or the key management engine for facilitating remote kill capabilities. One approach that can be taken to implement key management using HSMs is described in co-pending U.S. application Ser. No. 14/670,312, filed on Mar. 26, 2015, which is hereby incorporated by reference in its entirety.

As noted above, a content administrator would define a grid precision and a set of grid squares (GSs) that describe an area where the content can be viewed. Each file uploaded has a unique DEK (Data Encryption Key), and the system would encrypt this DEK using the GS and again using a KEK (Key Encryption Key). Thus, each file would have one DEK and that DEK would be encrypted |GSs| times.

Figure 8:
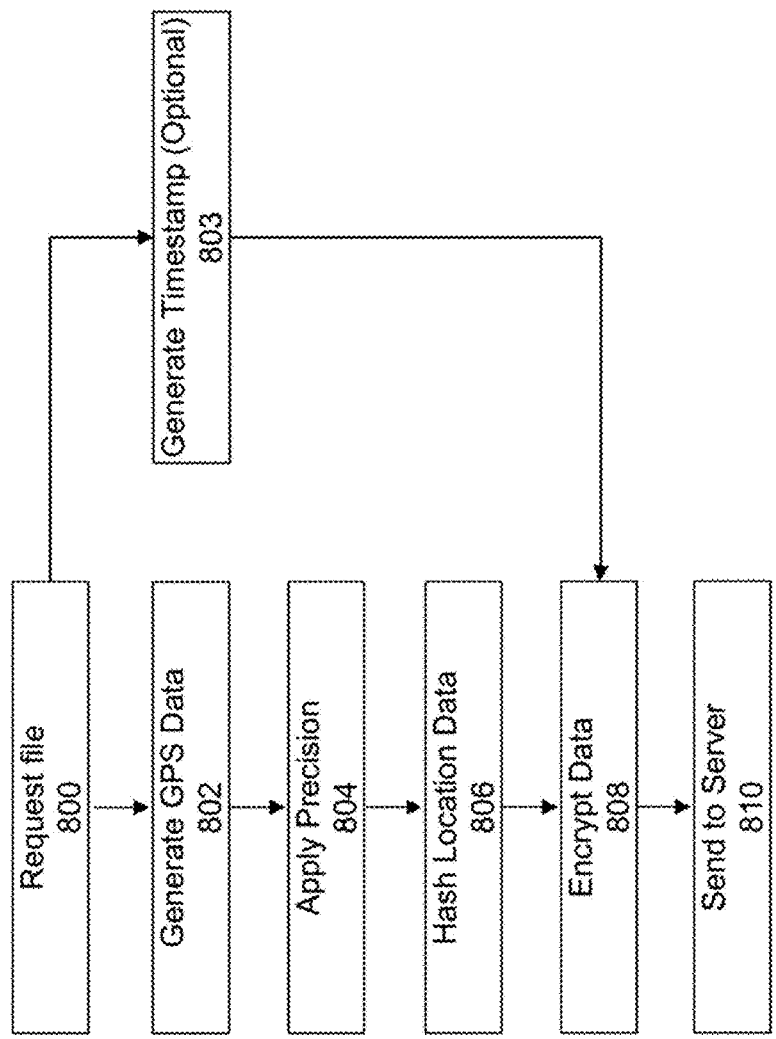
FIG. 8 illustrates a client request flow according to some embodiments of the invention to attempt to gain access to the encrypted file.

FIG. 8 illustrates a client request flow according to some embodiments of the invention to attempt to gain access to the encrypted file. At 800, the user may request an encrypted file F from a device, e.g., a mobile device. The request may be, for example, a result of an attempt to download or preview the encrypted file.

At 802, the mobile device uses its GPS to generate the location coordinate for the device. Precision may be applied at 804, e.g., where the procession of P=4 is applied to truncate any least significant digits beyond the precision level.

A GS may then be determined from the resulting coordinate location. At 806, the GS location data is then hashed. Hashing may be applied using a one-way hash function, which is applied to obscure the actual location of the user.

A current timestamp may also be obtained (803). The purpose of obtaining the timestamp is to protect against the user using some form of a replay process to use an earlier (not current) location values to attempt to obtain access to restricted files. At 808, the hashed value and the timestamp may be encrypted. This encryption prevents against possible attacks, e.g., attaches that use SSL traffic sniffing. At 810, the request along with the encrypted data are then sent to the server for processing.

Figure 9:
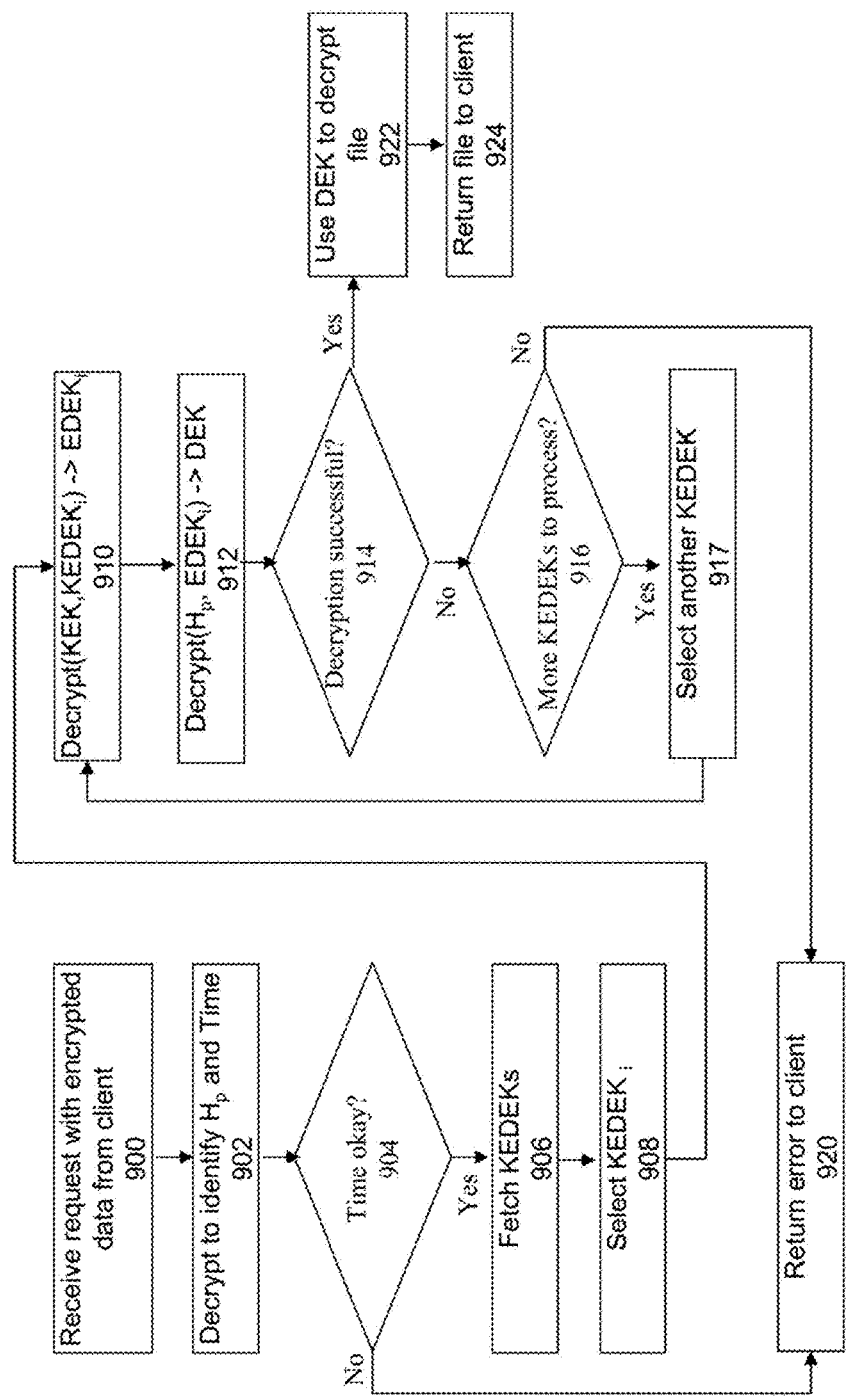
FIG. 9 shows a flowchart of a process to handle the client request according to some embodiments of the invention.

FIG. 9 shows a flowchart of a process to handle the client request according to some embodiments of the invention. At 900, the request and the encrypted data are received from the client. At 902, the encrypted data is decrypted to identify the hashed value H and the timestamp T.

A determination is made at 904 whether the timestamp T is acceptable. This determination is made to identify whether or not the timestamp is current. If not, then this may be an indication of a replay attack. If the timestamp is not acceptable, then an error is returned at 920.

If the timestamp is acceptable, then the KEDEKs for the file F of interest are fetched for processing at 906. At 908, a first KEDEK from the set if KEDEKs is selected for processing. At 910, the KEDEK is decrypted using the DEK value. This results in an EDEK value that corresponds to the KEDEK.

An attempt is then made at 912 to decrypt the EDEK with the H value. Recall that the H value represents the current location of the user. If the H value matches with the original H value that was originally used to encrypt the EDEK, then the decryption would be successful. This would mean that the user is currently at a location that was originally designated as an acceptable location to access the file F. If, however, the EDEK cannot successfully be decrypted with the H value, then there is a mismatch with the original H used to perform the encryption of the EDEK value.

A determination is made at 914 whether the decryption attempt was successful. If successful, then at 922, the decrypted DEK can be used to decrypt the file of interest. The decrypted file can then be sent to the client at 924.

If the decryption attempt was unsuccessful, then a further determination is made at 916 whether there are any further KEDEKs to process. If so, then the process selects another KEDEK at 917. The process will loop back through the above processing for the other KEDEK to see if any of them may correspond to the current H.

If there are no further KEDEKs that can be processed, this means that none of the KEDEKs correspond to the H value of the user's current location. This means that the user is not in an acceptable location for which access can be granted to the file. As such, the process proceeds to 920 to return an error message to the client.

In some embodiments, the role of the data requester may be taken into consideration when determining whether to grant access to the data item. For example, higher levels of access may be granted to executives or manager than are given to line employees. The differing levels of access can be implemented in numerous ways. For example, certain roles may result in the grant of absolute access to data items regardless of the requester's current location as being outside of the allowable boundary, e.g., for certain types of manager roles. On the other hand, employees having lower level roles in an organization may be denied access regardless of the employee's current location within the allowable access boundary.

In some embodiments, the role of the requester is considered in combination with his/her current location to determine whether to grant or deny access to the requested data item. In this situation, the role of the requester acts as a configurable expansion and/or reduction in the allowable access boundary to the data item. For example, the KEDEKs for a larger set of grid squares for an allowable boundary may be associated with requesters having higher level access roles, while a smaller set of KEDEKs for a smaller set of grid squares may be associated with requesters having lower level roles. In this way, a requester having a higher level role can obtain access to a data item over a larger set of geographic locations as compared to a requester having a lower level of access privileges/roles.

Therefore, what has been described is an improved approach to implement access control to content, were geographical information is used to control content access. The current approach provides advantages for numerous use scenarios. For example, hospitals can use this technology to make patient files only viewable on hospital premises. In the construction context content can be made viewable only at a construction site. With finance data, access to sensitive financial documentation can be restricted to specific physical locations appropriate or that data. In the government context, classified content can be restricted to onsite access only.

Figure 10A:
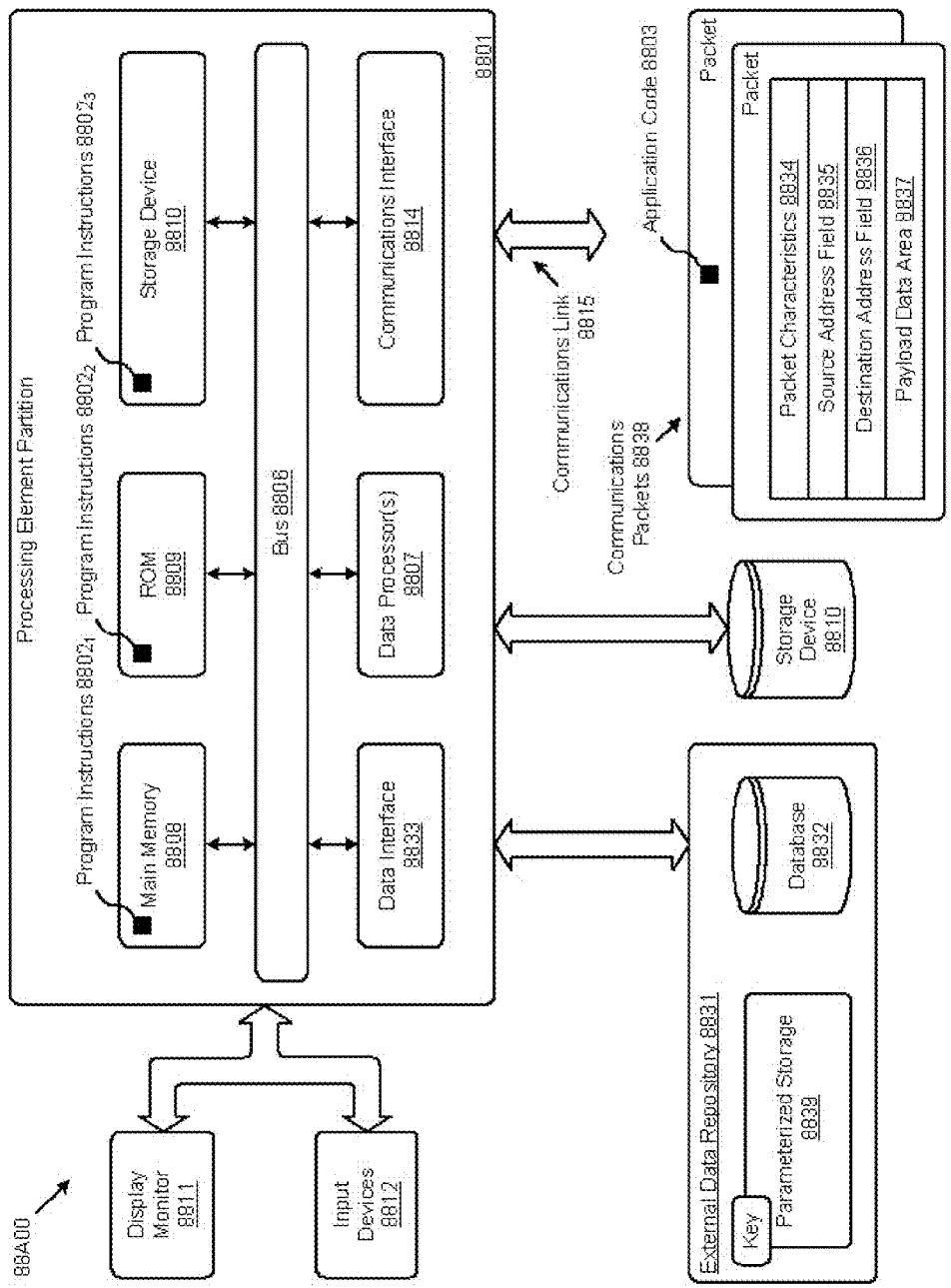
FIGS. 10A and 10B depict block diagrams of computer system(s) suitable for implementing embodiments of the present disclosure.

FIG. 10A depicts a block diagram of an instance of a computer system 88A00 suitable for implementing embodiments of the present disclosure. Computer system 88A00 includes a bus 8806 or other communication mechanism for communicating information. The bus interconnects subsystems and devices such as a central processing unit (CPU), or a multi-core CPU (e.g., data processor 8807), a system memory (e.g., main memory 8808, or an area of random access memory (RAM)), a non-volatile storage device or non-volatile storage area (e.g., read-only memory 8809), an internal or external storage device 8810 (e.g., magnetic or optical), a data interface 8833, a communications interface 8814 (e.g., PHY, MAC, Ethernet interface, modem, etc.). The aforementioned components are shown within processing element partition 8801, however other partitions are possible. The shown computer system 88A00 further comprises a display 8811 (e.g., CRT or LCD), various input devices 8812 (e.g., keyboard, cursor control), and an external data repository 8831.

According to an embodiment of the disclosure, computer system 88A00 performs specific operations by data processor 8807 executing one or more sequences of one or more program code instructions contained in a memory. Such instructions (e.g., program instructions 8802$_1$, program instructions 8802$_2$, program instructions 8802$_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 88A00 performs specific networking operations using one or more instances of communications interface 8814. Instances of the communications interface 8814 may comprise one or more networking ports that are configurable (e.g., pertaining to speed, protocol, physical layer characteristics, media access characteristics, etc.) and any particular instance of the communications interface 8814 or port thereto can be configured differently from any other particular instance. Portions of a communication protocol can be carried out in whole or in part by any instance of the communications interface 8814, and data (e.g., packets, data structures, bit fields, etc.) can be positioned in storage locations within communications interface 8814, or within system memory, and such data can be accessed (e.g., using random access addressing, or using direct memory access DMA, etc.) by devices such as data processor 8807.

The communications link 8815 can be configured to transmit (e.g., send, receive, signal, etc.) any types of communications packets 8838 comprising any organization of data items. The data items can comprise a payload data area 8837, a destination address 8836 (e.g., a destination IP address), a source address 8835 (e.g., a source IP address), and can include various encodings or formatting of bit fields to populate the shown packet characteristics 8834. In some cases the packet characteristics include a version identifier, a packet or payload length, a traffic class, a flow label, etc. In some cases the payload data area 8837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 8807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 8831, which in turn can be formatted into any one or more storage areas, and which can comprise parameterized storage 8839 accessible by a key (e.g., filename, table name, block address, offset address, etc.).

Execution of the sequences of instructions to practice certain embodiments of the disclosure is performed by a single instance of the computer system 88A00. According to certain embodiments of the disclosure, two or more instances of computer system 88A00 coupled by a communications link 8815 (e.g., LAN, PTSN, or wireless network) may perform the sequence of instructions required to practice embodiments of the disclosure using two or more instances of components of computer system 88A00.

The computer system 88A00 may transmit and receive messages such as data and/or instructions organized into a data structure (e.g., communications packets 8838). The data structure can include program instructions (e.g., application code 8803), communicated through communications link 8815 and communications interface 8814. Received program code may be executed by data processor 8807 as it is received and/or stored in the shown storage device or in or upon any other non-volatile storage for later execution. Computer system 88A00 may communicate through a data interface 8833 to a database 8832 on an external data repository 8831. Data items in a database can be accessed using a primary key (e.g., a relational database primary key).

The processing element partition 8801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 8807. Some embodiments include one or more special-purpose hardware components (e.g., power control, logic, sensors, transducers, etc.). A module may include one or more state machines and/or combinational logic used to implement or facilitate performance characteristics.

Various implementations of the database 8832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of the present disclosure). Such files or records can be brought into and/or stored in volatile or non-volatile memory.

Figure 10B:
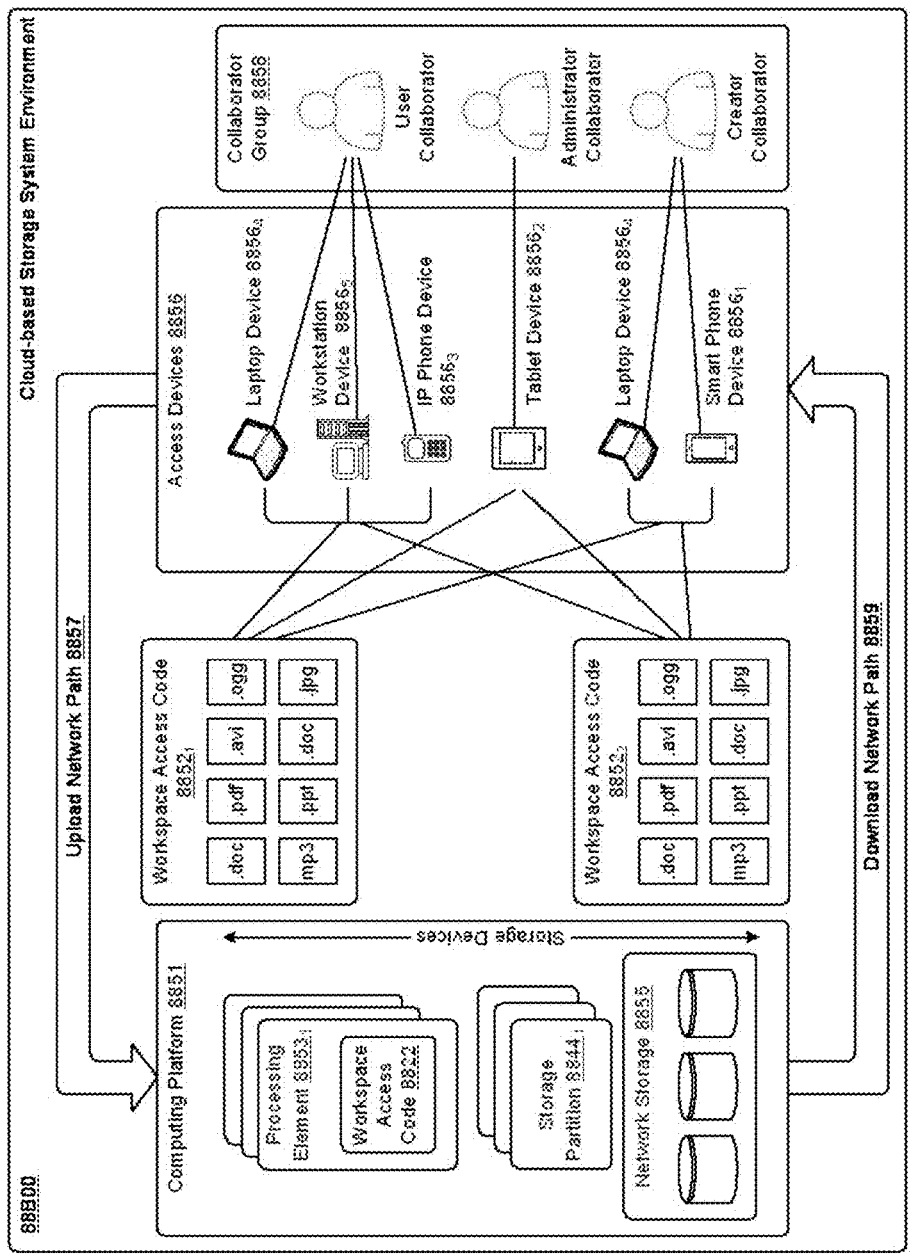

FIG. 10B depicts a block diagram of an instance of a cloud-based environment 88B00. Such a cloud-based environment supports access to workspaces through the execution of workspace view code (e.g., workspace access code $8852_1$ and workspace access code $8852_2$. Workspace access code can be executed on any of the shown access devices (e.g., laptop device $8852_4$, workstation device $8852_5$, IP phone device $8852_3$, tablet device $8852_2$, smart phone device $8852_1$, etc.). A group of users can form a collaborator group 8858, and a collaborator group can be comprised of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform, including in a middleware setting. As shown, a portion of the workspace access code resides in and can be executed on one or more processing elements (e.g., processing element $8852_3$). The workspace access code can interface with storage devices such as the shown networked storage 8855. Storage of workspaces and/or any constituent files or objects, and/or any other code or scripts or data can be stored in any one or more storage partitions (e.g., storage partition $8854_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 8857). A stored workspace can be delivered to a particular user and/or shared with other particular users via a download (e.g., a download from a processing element to an access device over a download network path 8859).

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

We claim:

1. A method for managing access to data, the method comprising:
    configuring a geographic region for a data item, wherein the geographic region is represented by a plurality of grid squares that is definable by a single coordinate location, the plurality of grid squares defines an area of protection for the data item;
    encrypting the data item with a key (DEK), wherein the DEK is encrypted by using the plurality of grid squares to generate a set of encrypted encryption key (EDEK);
    receiving a request to access the data item;
    identifying a location associated with the request to access the data item;
    determining whether to decrypt the data item based at least in part on the location associated with the request to access the data item, wherein the data item is decryptable if the location associated with the request corresponds to at least one EDEK from among the set of EDEK; and
    allowing or denying access to the data item based at least in part on if the location corresponds to a geographic location for which access is denied for the data item.

2. The method of claim 1, wherein the location associated with the request is identified using a GPS mechanism at a mobile device that sends the request.

3. The method of claim 2, wherein the information pertaining to the location comprises a one-way hashed value of location data for the mobile device.

4. The method of claim 1, where boundaries of the area are defined by incrementing or decrementing a digit of the coordinate.

5. The method of claim 4, wherein the location information comprises a hash of a value corresponding to the geographic region.

6. The method of claim 4, wherein the DEK can be decrypted only if the location information does not correspond to the location associated with the request to access the data item, where the data item is not decryptable unless the DEK can be decrypted, where the EDEK is encrypted to generate a double-encrypted key (KEDEK) that is stored in a cloud-based storage system.

7. The method of claim 6, where a set of KEDEKs is stored that corresponds to a set of location units corresponding to the geographic region, where upon receipt of the request, a set of KEDEKs are processed to determine if any KEDEK corresponds to the location associated with the request, and where access is denied to the data item if the location associated with the request does correspond to at least one KEDEK.

8. A computer program product, embodied in a non-transitory computer readable medium, the non-transitory computer readable medium having stored thereon a sequence of instructions which, when executed by a processor causes the processor to execute a process, the process comprising:
    configuring a geographic region for a data item, wherein the geographic region is represented by a plurality of grid squares that is definable by a single coordinate location, the plurality of grid squares defines an area of protection for the data item;
    encrypting the data item with a key (DEK), wherein the DEK is encrypted by using the plurality of grid squares to generate a set of encrypted encryption key (EDEK);
    receiving a request to access the data item;
    identifying a location associated with the request to access the data item;
    determining whether to decrypt the data item based at least in part on the location associated with the request to access the data item, wherein the data item is decryptable if the location associated with the request corresponds to at least one EDEK from among the set of EDEK; and
    allowing or denying access to the data item based at least in part on if the location corresponds to a geographic location for which access is denied for the data item.

9. The computer program product of claim 8, wherein the location associated with the request is identified using a GPS mechanism at a mobile device that sends the request.

10. The computer program product of claim 9, wherein the information pertaining to the location comprises a one-way hashed value of location data for the mobile device.

11. The computer program product of claim 8, where boundaries of the area are defined by incrementing or decrementing a digit of the coordinate.

12. The computer program product of claim 11, wherein the location information comprises a hash of a value corresponding to the geographic region.

13. The computer program product of claim 11, wherein the DEK can be decrypted only if the location information does not correspond to location associated with the request to access the data item, where the data item is not decryptable unless the DEK can be decrypted.

14. The computer program product of claim 13, where the EDEK is encrypted to generate a double-encrypted key (KEDEK) that is stored in a cloud-based storage system with the data item.

15. The computer program product of claim 13, where a set of KEDEKs is stored that corresponds to a set of location units corresponding to the geographic region.

16. The computer program product of claim 15, where upon receipt of the request, a set of KEDEKs are processed to determine if any KEDEK corresponds to the location associated with the request, and where access is denied to the data item if the location associated with the request does correspond to at least one KEDEK.

17. A system for managing access to data, the system comprising:
   a processor;
   a memory comprising a computer program product, embodied in a non-transitory computer readable medium, the non-transitory computer readable medium having stored thereon a sequence of instructions which, when executed by the processor causes the processor to execute a process, the process comprising:
   configuring a geographic region for a data item, wherein the geographic region is represented by a plurality of grid squares that is definable by a single coordinate location, the plurality of grid squares defines an area of protection for the data item;
   encrypting the data item with a key (DEK), wherein the DEK is encrypted by using the plurality of grid squares to generate a set of encrypted encryption key (EDEK);
   receiving a request to access the data item;
   identifying a location associated with the request to access the data item;
   determining whether to decrypt the data item based at least in part on the location associated with the request to access the data item, wherein the data item is decryptable if the location associated with the request corresponds to at least one EDEK from among the set of EDEK; and
   allowing or denying access to the data item based at least in part on if the location corresponds to a geographic location for which access is denied for the data item.

18. The system of claim 17, wherein the location associated with the request is identified using a GPS mechanism at a mobile device that sends the request.

* * * * *